2,787,621
METAL SALTS OF ACYLATED AMINOTHIO-PHENOLS AS CATALYTIC PLASTICIZERS FOR RUBBER

Edwin O. Hook, New Canaan, and Arnold R. Davis, Riverside, Conn., assignors to American Cyanamid Company, New York, N. Y., a corporation of Maine No Drawing. Application October 22, 1953, Serial No. 387,775

6 Claims. (Cl. 260—347.2)

This invention relates to a new plasticizer for elastomeric compositions, to plasticizing elastomeric compositions and to compositions so produced.

One procedure for plasticizing or softening rubber or synthetic rubbers comprises the use of small amounts of chemicals. For example, some of the aromatic mercaptans and certain nitroso compounds can be utilized under suitable conditions to produce the desired effect. While the exact nature of their action is not completely understood, the use of these chemical plasticizers or "peptizers" is common. It is with their manufacture and use that the present invention is concerned.

In the past, known plasticizers have been objectionable for one or more of several reasons. Some, for instance, are not suitably compatible with various elastomers. Others are toxic. Many are either skin irritants or skin sensitizers and are objectionable to those obliged to handle the material. Others are characterized by very disagreeable odors which are often imparted to finished articles. Some are not sufficiently effective at the relative low temperatures of the open mill. Still others are too unstable on storage. Moreover, some materials effective in the processing of natural rubber are found to be ineffective for softening synthetic rubber-like polymers.

As a result, suitable plasticizers are limited in spite of the wide demand for materials adapted for this purpose. It is the primary object of this invention, therefore, to provide a new class of plasticizers. Such plasticizers should be substantially free of the various objections noted above. In addition, they should be effective not only in the treatment of natural rubber, but also in the treatment of synthetic rubber-like polymers such, for example, as copolymers of butadiene and styrene, butadiene and acrylonitrile and the like.

In general, the plasticizers forming the present invention comprise metal salts of acylated aminothiophenols of the formula

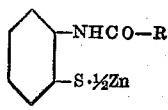

where R is an alkyl or alkoxy radical of 1–12 carbon atoms; an aryl radical of 6–12 carbon atoms such as phenyl, tolyl, xylyl, napthyl and the like; or a heterocyclic radical such as furyl, thienyl, pyrrolidyl, pyridyl and the like. While the meta derivatives are also active, they appear to be less so and also are less readily obtained.

The products of this invention are free to a startling degree of the various objections to known plasticizers described above. Moreover, they are readily employed with both natural and synthetic rubbers. Thus, they may be effectively employed in plasticizing, for example, polymers of butadiene 1,3 with styrene or acrylonitrile. An outstanding feature is the effectiveness of these compounds at the relatively low temperatures of the open mill. While the amount of plasticizer is not critical, nevertheless a decided advantage of this invention resides in the fact that superior results are obtained using substantially less plasticizer than that necessary to obtain the most satisfactory results using the more effective of the commercially available plasticizers. In general, amounts as little as 0.01 part per hundred parts of elastomer may be effectively employed. The actual amount employed depends on the particular compound, the particular elastomer and the extent of softening desired. In general, amounts employed may vary from 0.01 to 5 parts per 100 parts of elastomer.

Preparation of this series of compounds may be illustrated by the following examples which are intended only as illustrative and not by way of limitation. All parts are by weight unless otherwise noted.

EXAMPLE 1

Zinc o-benzamidothiophenate

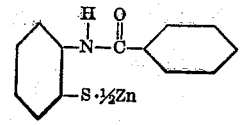

45.6 parts of o,o'-dibenzamidodiphenyldisulfide and 7.2 parts of zinc dust with one part of a commercial wetting agent sold under the trade-mark of Ultrawet 30 DS were slurried in 100 parts of methanol and warmed slightly. 0.8 parts of concentrated hydrochloric acid were then added, the mixture refluxed for 1½ hours and then filtered, leaving less than one part of gray insolubles. The filtate was poured into ice water and resultant precipitate collected, washed and dried. Dried precipitate was slurried in benzene and dried in vacuum over phosphorous pentoxide. M. P. 165°–177° C.; yield 92.6%; percent N: calc. 5.38, found 5.2; percent Zn: calc. 12.48, found 12.3.

EXAMPLE 2

Zinc o-acetamidothiophenate

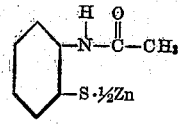

The procedure of Example 1 was followed using 52 parts of o,o'-diacetamidodiphenyldisulfide, 11 parts of zinc dust and 0.9 part of concentrated hydrochloric acid. The product obtained melted at 280° C. percent N: calc. 7.06, found 6.57; percent Zn: calc. 16.3, found 16.5.

EXAMPLE 3

Zinc o-(2-furoylamido)thiophenate

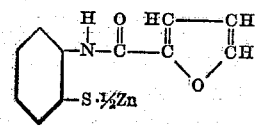

13.1 parts of o,o'-dithiobis(2-furoylanilide) and 2.1 parts of zinc dust were slurried in 50 parts of methanol and 7 parts of concentrated hydrochloric acid. Resultant slurry was refluxed for 50 minutes and filtered. The filtrate was added to ice water, filtered again and precipitate collected, washed and dried. Precipitate was reslurried in chloroform and dried over phosphorous pentoxide in vacuum. M. P. 158°–180° C.; percent N: calc. 5.59, found 5.39; percent Zn: calc. 13, found 12.6.

EXAMPLE 4

*Zinc o-(carbethoxyamido)thiophenate*

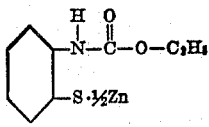

The procedure of Example 1 was followed using 19.6 parts of o,o-di(carbethoxyamido)diphenyldisulfide, 3.6 parts of zinc dust, 0.7 part of concentrated hydrochloric acid and 130 parts of methyl alcohol. The product obtained had a M. P. of 118°–131° C. percent N: calc. 6.14%, found 6.01; percent Zn: calc. 14.2, found 13.46.

EXAMPLE 5

*Zinc o-(carboisobutoxyamido)thiophenate*

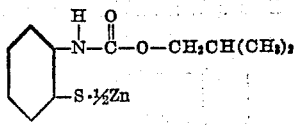

The procedure of Example 1 was followed using 112 parts of di(carboisobutoxyamido)thiophenate, 16.9 parts of zinc dust, 0.2 part of concentrated hydrochloric acid and 375 parts of methyl alcohol. Product melted at 96°–119° C. percent N: calc. 5.46, found 5.10; percent Zn: calc. 12.65, found 11.8.

The following examples illustrate the plasticizing effect of the compounds of this invention on natural rubber and GR-S-1500 (80% butadiene and 20% styrene made at 41° F.). Testing was done in a Mooney shearing disc plastometer. The readings in the examples are viscosity readings after 4 minutes in the plastometer at 212° F. The lower the reading the greater the plasticity. All parts are by weight unless otherwise noted.

EXAMPLE 6

Samples of natural rubber were milled for 10 minutes at 212° F. with various zinc salts of acylated aminothiophenols using as blanks a sample with no plasticizer and one with dibenzamidodiphenyldisulfide. Results are shown in Table I.

*Table I*

| | Sample Number | | | | | |
|---|---|---|---|---|---|---|
| | 1 | 2 | 3 | 4 | 5 | 6 |
| Smoked Sheets | 100 | 100 | 100 | 100 | 100 | |
| Dibenzamidodiphenyldisulfide | | 0.125 | | | | |
| Zn o-benzamidothiophenate | | | 0.125 | | | |
| Zn o-carbethoxyamidothiophenate | | | | 0.125 | | |
| Zn o-acetamidothiophenate | | | | | 0.125 | |
| Zn o-furoylamidothiophenate | | | | | | 0.125 |
| Mooney viscosity at 212°F. (ML-4) | 72+ | 59- | 36 | 31.5 | 41 | 44 |

The above table shows the products of this invention to give improved softening effect over dibenzamidodiphenyldisulfide, one of the more superior commercially available plasticizers.

EXAMPLE 7

Example 6 was repeated varying the amounts of plasticizers, replacing zinc o-acetamidothiophenate with zinc o-(carboisobutoxyamido)thiophenate and omitting the zinc o-furoyl derivative.

*Table II*

| | Sample Number | | | | |
|---|---|---|---|---|---|
| | 1 | 2 | 3 | 4 | 5 |
| Smoked Sheets | 100 | 100 | 100 | 100 | 100 |
| Dibenzamidodiphenyldisulfide | | 0.125 | | | |
| Zn o-benzamidothiophenate | | | 0.094 | | |
| Zn o-carbethoxyamidothiophenate | | | | 0.0625 | |
| Zn o-carboisobutoxyamidothiophenate | | | | | 0.0625 |
| Mooney viscosity at 212° F. (ML-4) | 73.5 | 62 | 44 | 42.5 | 41.5 |

Table II clearly shows that superior results are obtained at low milling temperatures with relatively smaller amounts of the compounds of this invention than with commercially available dibenzamidodiphenyldisulfide.

EXAMPLE 8

Samples of GR-S-1500 (80% butadiene and 20% styrene) were milled at 100° C. for 10 minutes with varying amounts of zinc o-(carboisobutoxyamido)thiophenate and using similar blanks as in Examples 6 and 7.

*Table III*

| | Sample Number | | | |
|---|---|---|---|---|
| | 1 | 2 | 3 | 4 |
| GR-S-1500 | 100 | 100 | 100 | 100 |
| Dibenzamidodiphenyldisulfide | | 1.5 | | |
| Zn o-carboisobutoxyamidothiophenate | | | 0.75 | 1.5 |
| Mooney viscosity 212° F. (ML-4) | 49.5 | 47 | 35.5 | 32.5 |

As with natural rubber, superior plasticizing effects are obtained with synthetic rubbers when using the compounds of this invention even when used in lesser amounts than the commercially available plasticizer.

We claim:

1. Zinc salts of acylated aminothiophenols having the type formula

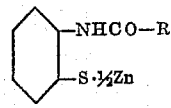

in which R is selected from the group consisting of alkyl and alkoxy radicals of 1–12 carbon atoms, aryl radicals of 6–12 carbon atoms, and heterocyclic radicals selected from the group consisting of furyl, thienyl, pyrrolidyl and pyridyl.

2. Zinc o-(carboisobutoxyamido)thiophenate having the formula

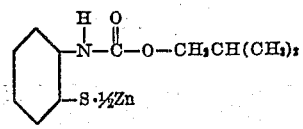

3. Zinc o-(carbethoxyamido)thiophenate having the formula

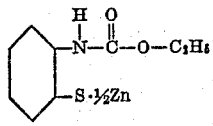

4. Zinc o-benzamidothiophenate having the formula

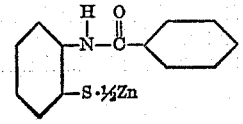

5. Zinc o-(2-furoylamido)thiophenate having the formula
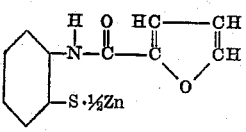
6. Zinc o-acetamidothiophenate having the formula
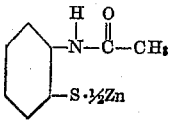
References Cited in the file of this patent
UNITED STATES PATENTS
| | | |
|---|---|---|
| 2,467,789 | Verbanc | Apr. 19, 1949 |
| 2,470,945 | Paul | May 24, 1949 |
| 2,618,620 | Patrick et al. | Nov. 18, 1952 |
| 2,695,898 | Lober | Nov. 30, 1954 |
OTHER REFERENCES
Hinsberg: Berichte 38, 1134 (1905).
Zincke: Berichte 46, 784 (1913).
Schiller: Berichte 9, 1637 (1876).
Bogert: J. A. C. S. 46:1308–1311 (1924).